(12) United States Patent
Kamiyama et al.

(10) Patent No.: US 11,374,291 B2
(45) Date of Patent: Jun. 28, 2022

(54) SECONDARY CELL

(71) Applicant: Panasonic Corporation, Kadoma (JP)

(72) Inventors: Yuma Kamiyama, Osaka (JP); Kazuki Endo, Hyogo (JP)

(73) Assignee: Panasonic Holdings Corporation, Kadoma (JP)

( * ) Notice: Subject to any disclaimer, the term of this patent is extended or adjusted under 35 U.S.C. 154(b) by 451 days.

(21) Appl. No.: 16/303,888

(22) PCT Filed: May 18, 2017

(86) PCT No.: PCT/JP2017/018611
§ 371 (c)(1),
(2) Date: Nov. 21, 2018

(87) PCT Pub. No.: WO2017/204064
PCT Pub. Date: Nov. 30, 2017

(65) Prior Publication Data
US 2020/0321594 A1    Oct. 8, 2020

(30) Foreign Application Priority Data

May 27, 2016  (JP) .............................. JP2016-106401

(51) Int. Cl.
*H01M 50/54*    (2021.01)
*H01M 4/36*    (2006.01)
(Continued)

(52) U.S. Cl.
CPC ........... *H01M 50/54* (2021.01); *H01M 4/364* (2013.01); *H01M 10/058* (2013.01);
(Continued)

(58) Field of Classification Search
CPC ..... H01M 2004/027; H01M 2004/028; H01M 2004/029; H01M 50/54; H01M 50/46;
(Continued)

(56) References Cited

U.S. PATENT DOCUMENTS

| 2012/0164497 A1* | 6/2012 | Saito ................. H01M 10/0413 429/61 |
| 2012/0189882 A1* | 7/2012 | Kurahashi ........... H01M 10/647 429/81 |
| 2014/0045028 A1* | 2/2014 | Moon ................. H01M 10/657 429/120 |

FOREIGN PATENT DOCUMENTS

| JP | 59-138070 A | 8/1984 |
| JP | 9-115552 A  | 5/1997 |

(Continued)

OTHER PUBLICATIONS

Kanbe, Chika, Flat Type Secondary Battery and Battery Pack, 2005, Translation of JP2005056655 (Year: 2005).*

(Continued)

*Primary Examiner* — Maria Laios
*Assistant Examiner* — Adam J Francis
(74) *Attorney, Agent, or Firm* — WHDA, LLP

(57) ABSTRACT

A secondary cell includes an electrode body including a plurality of electrode groups each including a plurality of positive electrodes, a plurality of negative electrodes, and at least one separator, the positive electrodes and the negative electrodes each being alternately stacked on each other with the separator interposed in between; and at least one metal plate disposed between the electrode groups. Electrodes that are disposed at both ends of each of the electrode groups are the negative electrodes. The metal plate is in contact with a mixture layer of a negative electrode constituting at least one of the electrode groups, the metal plate being provided in a noncontact state with conductive members other than the mixture layer.

3 Claims, 6 Drawing Sheets

(51) Int. Cl.
*H01M 50/46* (2021.01)
*H01M 10/6555* (2014.01)
*H01M 10/654* (2014.01)
*H01M 10/647* (2014.01)
*H01M 10/058* (2010.01)
*H01M 4/02* (2006.01)

(52) U.S. Cl.
CPC ....... *H01M 10/647* (2015.04); *H01M 10/654* (2015.04); *H01M 10/6555* (2015.04); *H01M 50/46* (2021.01); *H01M 2004/027* (2013.01); *H01M 2004/028* (2013.01)

(58) Field of Classification Search
CPC ...... H01M 4/364; H01M 10/42; H01M 10/60; H01M 12/00; H01M 12/005; H01M 10/654; H01M 10/655; H01M 10/653
See application file for complete search history.

(56) References Cited

FOREIGN PATENT DOCUMENTS

| | | |
|---|---|---|
| JP | 2005-56655 A | 3/2005 |
| JP | 2009-252501 A | 10/2009 |
| JP | 2010-287488 A | 12/2010 |
| JP | 2010-287491 A | 12/2010 |
| JP | 2012-79833 A | 4/2012 |
| JP | 2016-31851 A | 3/2016 |
| WO | 2012/043737 A1 | 4/2012 |

OTHER PUBLICATIONS

International Search Report dated Aug. 15, 2017, issued in counterpart International Application No. PCT/JP2017/018611 (2 pages).

* cited by examiner

SECONDARY CELL

TECHNICAL FIELD

The present disclosure relates to a secondary cell.

BACKGROUND ART

In a secondary cell including a stacked electrode body in which a plurality of positive electrodes and a plurality of negative electrodes are each alternately stacked on each other with a separator in between, suppression of generation of heat when an abnormality such as an internal short circuit or the like occurs is awaited. For example, Patent Literature 1 discloses a secondary cell that includes a metal plate (a heat releasing plate) that is provided between positive electrodes and negative electrodes while being in contact with a container so as to allow prompt cooling even when a thermal runaway occurs inside the electrode body. There are separators on both sides of the metal plate to secure insulation between the metal plate and the electrodes.

CITATION LIST

Patent Literature

PTL 1: Japanese Published Unexamined Patent Application No. 2010-287488

SUMMARY OF INVENTION

The secondary cell of PTL 1 is, compared with a case in which the above metal plate is not included, expected to exert a heat generation suppressing effect when an abnormality occurs. However, in the secondary cell of PTL 1, since there are separators interposed between the metal plate and the electrodes, a satisfactory heat releasing effect cannot be obtained unless the separators become melted and the metal plate and the electrodes come in contact with each other. Furthermore, since the metal plate and the container are in contact with each other, there is also a problem in that, when the separators become melted and the metal plate and the electrodes come in contact with each other, the electric current flows into the metal plate and the metal plate itself generates heat.

A secondary cell according to the present disclosure is an electrode body including a plurality of electrode groups each including a plurality of positive electrodes, a plurality of negative electrodes, and at least one separator, the positive electrodes and the negative electrodes each being alternately stacked on each other with the separator interposed in between; and at least one metal plate disposed between the electrode groups. Furthermore, electrodes that are disposed at both ends of each of the electrode groups are the negative electrodes, and the metal plate is in contact with a mixture layer of a negative electrode that constitutes at least one of the electrode groups and is provided in a noncontact state with conductive members other than the mixture layer.

A secondary cell according to the present disclosure is capable of sufficiently suppressing an abnormal generation of heat in a stacked electrode body.

DESCRIPTION OF EMBODIMENTS

Figure 1:
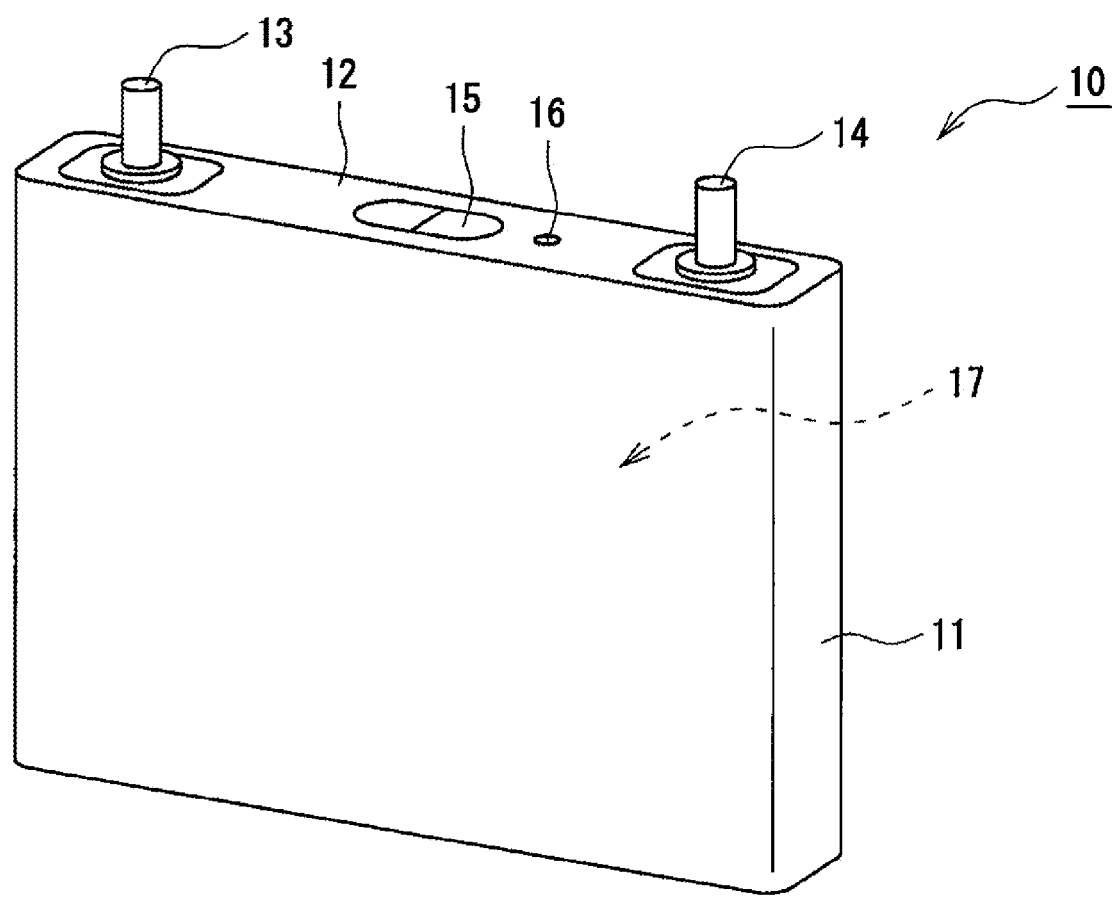
FIG. 1 is a perspective view illustrating an appearance of a secondary cell that is an example of an embodiment.

In a secondary cell according to the present disclosure, a metal plate that functions as a heat releasing member is directly in contact with negative electrodes that constitute electrode groups, and a satisfactory thermal contact between the metal plate and the electrode groups is secured at all times. Accordingly, local heat generated at an initial stage of an occurrence of an abnormality, such as an internal short circuit, can be released promptly and, for example, further generation of heat due to an increase in the short circuited portion can be prevented. Furthermore, since the metal plate does not come in contact with conductive members (collector members such as, for example, an outer can and negative electrode tabs) other than the negative electrode mixture layers, a problem such as the metal plate generating heat due to a large current flowing in the metal plate does not occur. In other words, since the metal plate is in contact with the negative electrodes constituting the electrode groups through the resistance of the mixture layer, a circuit having a low resistance and in which a large electric current flows in the metal plate is not formed. Accordingly, the secondary cell according to the present disclosure is capable of sufficiently suppressing an abnormal generation of heat in the stacked electrode body.

Hereinafter, referring to the drawings, an example of an embodiment will be described in detail. The drawings referred to in describing the embodiment are illustrated in a schematic manner, and the specific sizes and the like of the components are to be determined after taking the following description into consideration. Hereinafter, an example of a square battery in which a stacked electrode body 17 is housed in a square metal case including an outer can 11 and a sealing plate 12 will be illustrated; however, the battery case is not limited to the above and may be a resin case (a laminated battery) constituted by a resin film, for example.

FIG. 1 is a perspective view illustrating an appearance of a secondary cell 10 that is an example of the embodiment. As exemplified in FIG. 1, the secondary cell 10 includes the outer can 11 that houses the electrode body 17, and the sealing plate 12 that closes an opening of the outer can 11. The secondary cell 10 is, for example, a nonaqueous electrolyte secondary cell and, desirably, is a lithium ion secondary cell. However, the type of the secondary cell 10 is not limited in particular. The outer can 11 is a bottomed tubular metal container and houses the electrode body 17 and a nonaqueous electrolyte solution.

The sealing plate 12 is provided with a positive electrode external terminal 13, a negative electrode external terminal 14, a gas discharge valve 15, and a liquid injection portion 16. The positive electrode external terminal 13 and the negative electrode external terminal 14 are attached to the sealing plate 12 while being electrically insulated from the sealing plate 12 with an insulation gasket, for example. Note that only a negative electrode external terminal serving as an external terminal may be provided in the sealing plate 12 so that the outer can 11 is configured as a positive electrode external terminal. Typically, the liquid injection portion 16 is configured of an injection hole for injecting an electrolyte, and a sealing plug that closes the injection hole.

Figure 2:
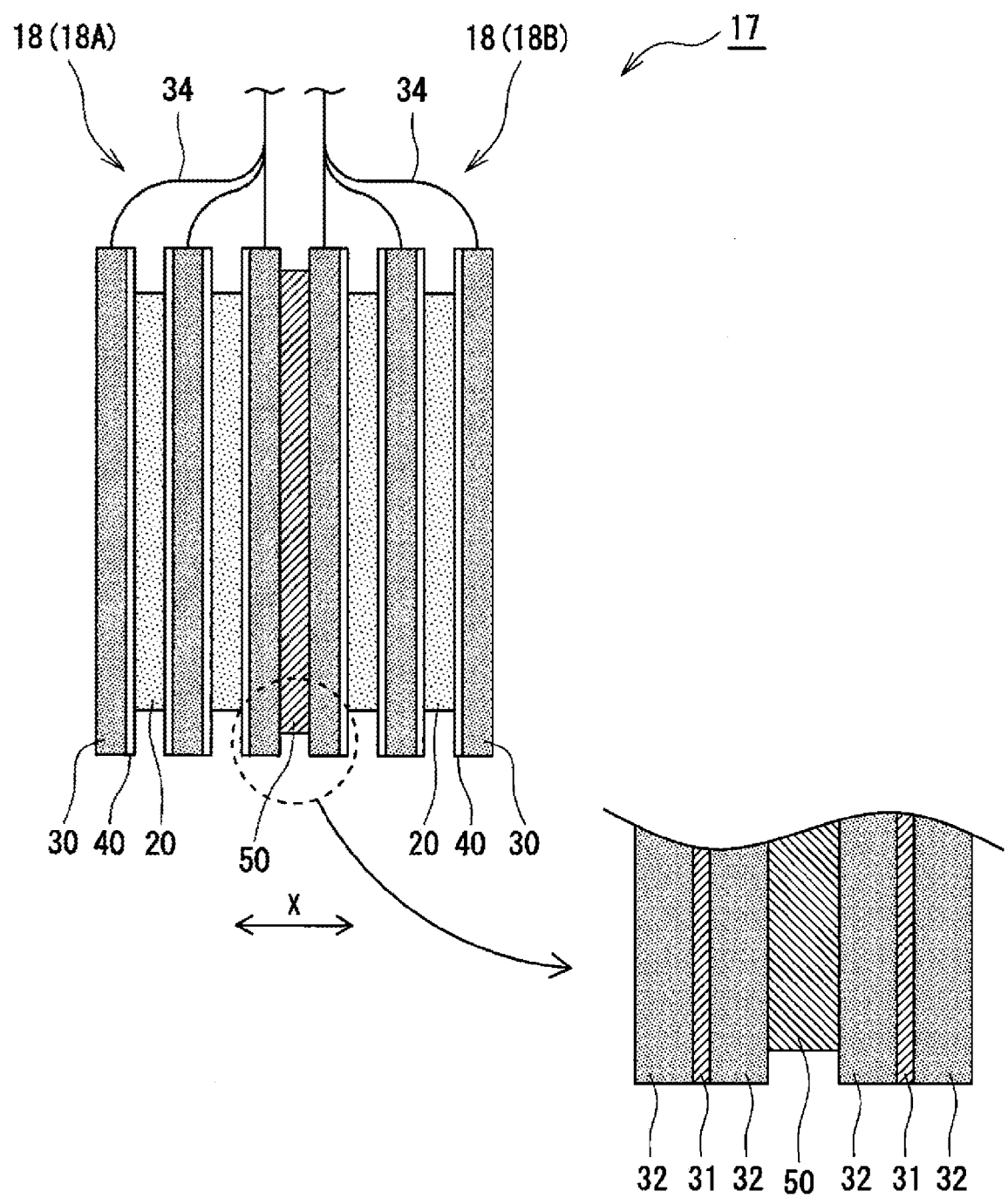
FIG. 2 is a cross-sectional view of electrode bodies that are each an example of the embodiment.
Figure 3:
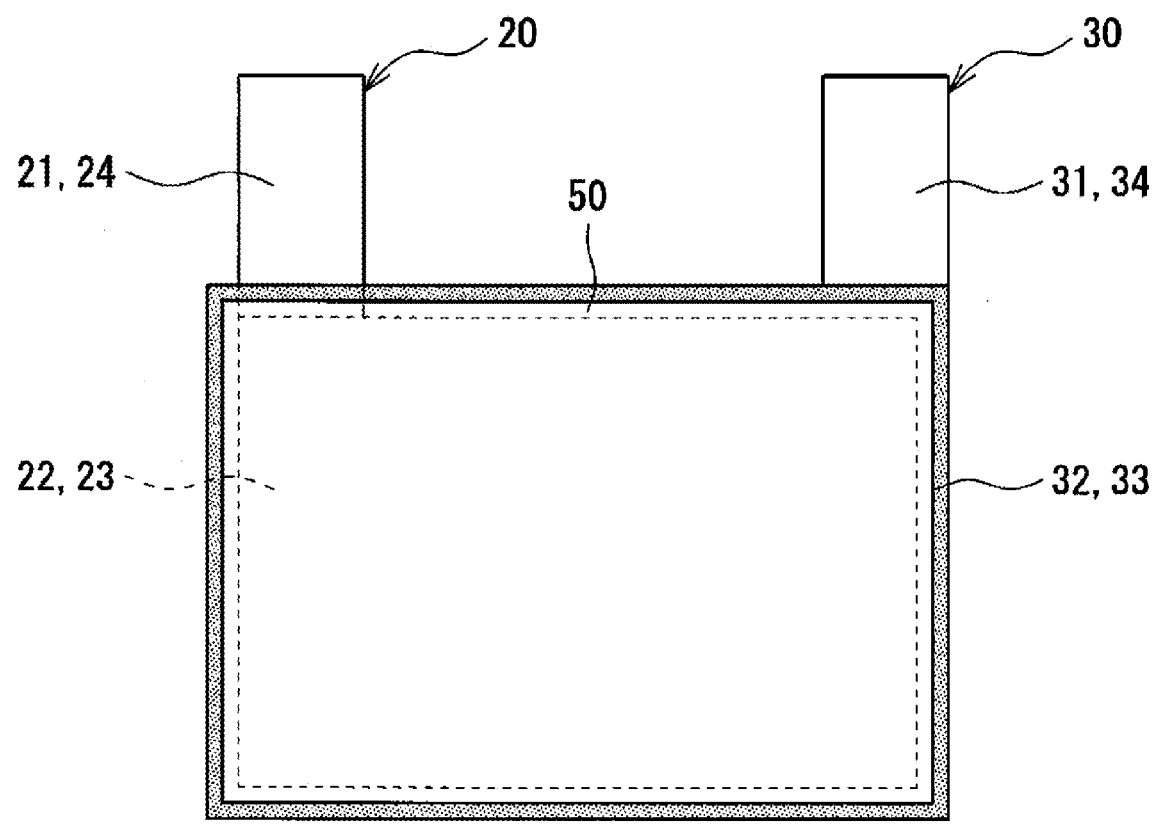
FIG. 3 is a front view of a positive electrode, a negative electrode, and a metal plate that constitute the electrode body that is an example of the embodiment.

FIGS. 2 and 3 are drawings illustrating the electrode body 17 that is an example of the embodiment (in FIG. 3, separators 40 are not shown). As exemplified in FIG. 2, the electrode body 17 includes a plurality of electrode groups 18, and at least one metal plate 50 disposed between the electrode groups 18. Each of the electrode groups 18 includes a plurality of positive electrodes 20, a plurality of negative electrodes 30, and at least one separator 40 and has a structure in which the positive electrodes 20 and the negative electrodes 30 are each alternately stacked with the separator 40 interposed therebetween. In the present embodiment, a plurality of separators 40 are provided and are each disposed on both sides of each positive electrode 20. Hereinafter, a direction in which the positive electrodes, the negative electrodes, and the separators in the electrode groups overlap each other is referred to as a stacking direction X.

The number of positive electrodes 20 and the number of negative electrodes 30 that constitute each electrode group 18 are not particularly limited; however, generally, each number is about 10 to 70. In the example illustrated in FIG. 2, the electrode body 17 is constituted by two electrode groups 18 (hereinafter, one is referred to as an electrode group 18A and the other is referred to as an electrode group 18B) that have the same number of stacked electrodes and that are overlapped in the stacking direction X. In the electrode body 17, in order to prevent the arrangement of the electrode group 18A, the electrode group 18B, and the metal plate 50 from being distorted, for example, the electrode groups 18A and 18B between which the metal plate 50 is interposed are each covered and bundled with an insulation sheet. Alternatively, edge portions of the metal plate 50 may be fixed to the electrode groups 18A and 18B using an insulation tape.

The electrodes that are disposed at both ends of the electrode groups 18A and 18B are negative electrodes 30. In other words, the negative electrodes 30 are provided with an extra piece of electrode compared with the positive electrodes 20. As described later, in the negative electrodes 30, a negative electrode mixture layer 32 is famed on both surfaces of a negative electrode core material 31 so that a negative electrode mixture layer 32 is famed on each surface that opposes the outer side of the electrode groups 18 and that does not oppose the positive electrode 20. Furthermore, the metal plate 50 is in contact with the mixture layer of the negative electrode 30 that constitutes at least one of the groups of the electrodes 18 and is, in a noncontact state with the conductive members other than the above mixture layer, provided between the electrode group 18A and the electrode group 18B.

As exemplified in FIG. 3, the positive electrodes 20 each include a positive electrode core material 21 and a positive electrode mixture layer 22 famed on both surfaces of the positive electrode core material 21. A metal film, which is stable in the potential range of the positive electrode 20, such as aluminum, or a film or the like in which the above metal is disposed on the surface thereof can be used as the positive electrode core material 21. The positive electrode mixture layer 22 contains a positive electrode active material such as, for example, a lithium-containing composite oxide, a conductive material, and a binding material. An example of a desirable lithium-containing composite oxide include a Ni—Co—Mn based or a Ni—Co—Al based lithium-containing composite oxide.

Each positive electrode 20 includes a positive electrode base portion 23, and a positive electrode tab 24 that protrudes from one end of the positive electrode base portion 23. The positive electrode base portion 23 has a substantially rectangular shape in plan view, and positive electrode mixture layers 22 are formed on the entire area thereof. The positive electrode tab 24 is a portion in which the positive electrode mixture layer 22 is not formed and is a portion in which the positive electrode core material 21 is exposed. The positive electrode tab 24 is electrically connected to the positive electrode external terminal 13 directly or through another conductive member. Note that the positive electrode mixture layer 22 may be formed at the base portion of the positive electrode tab 24. The positive electrode tab 24 is, for example, famed by protruding a portion of the positive electrode core material 21.

The thickness of the positive electrode 20 is not particularly limited but is preferably 60 μm to 200 μm. In the above, the thickness of the positive electrode core material 21 is 5 μm to 15 μm, for example. The sum of the thicknesses of the positive electrode mixture layers 22 on both sides of the positive electrode core material 21 is 40 μm to 190 μm. The positive electrodes 20 are manufactured by coating a positive electrode mixture slurry containing the positive electrode active material, the conductive material, the binding material, and the like on a surface of a long member of the positive electrode core material 21 other than the portion that is to become the positive electrode tab 24, by rolling the coating film and forming the positive electrode mixture layer 22 on both surfaces of the core material, and then by cutting the above into the size of the positive electrode 20. The negative electrodes 30 can be manufactured with a method similar to that of the positive electrodes 20 by using a negative electrode mixture slurry.

As exemplified in FIGS. 2 and 3, the negative electrodes 30 each include the negative electrode core material 31 and the negative electrode mixture layer 32 formed on both surfaces of the negative electrode core material 31. A metal film, which is stable in the potential range of the negative electrode 30, such as copper, or a film or the like in which the above metal is disposed on the surface thereof can be used as the negative electrode core material 31. The negative electrode mixture layer 32 contains, for example, a negative electrode active material and a binding material. The material of the negative electrode active material is not limited in particular as long as lithium ion can be reversibly occluded and released, and can exemplarily include a carbon material, such as natural graphite or artificial graphite, metal such as Si or Sn that can be alloyed with lithium, an alloy, or a composite oxide.

Each negative electrode 30 includes a negative electrode base portion 33, and a negative electrode tab 34 that protrudes from one end of the negative electrode base portion 33. The negative electrode base portion 33 has a substantially rectangular shape in plan view, and the negative electrode mixture layers 32 are formed on the entire area thereof. The negative electrode tab 34 is a portion in which the negative electrode mixture layer 32 is not formed and is a portion in which the negative electrode core material 31 is exposed. The negative electrode tab 34 is electrically connected to the negative electrode external terminal 14 directly or through another conductive member. Note that the negative electrode mixture layer 32 may be formed at the base portion of the negative electrode tab 34. The negative electrode tab 34 is, for example, famed by protruding a portion of the negative electrode core material 31.

The thickness of the negative electrode 30 is not particularly limited but is preferably 60 μm to 200 μm. In the above, the thickness of the negative electrode core material 31 is 5 μm to 15 μm, for example, and is desirably thinner than the positive electrode core material 21. The sum of the thicknesses of the negative electrode mixture layers 32 on both sides of the negative electrode core material 31 is 40 μm to 190 μm.

As described above, the positive electrodes 20 and the negative electrodes 30 are each disposed so as to opposed each other with the separators 40 interposed therebetween. In order to prevent deposition of lithium in the negative electrodes 30, the negative electrodes 30 are formed larger than the positive electrodes 20, and the portions (the positive electrode base portions 23 and the base portions of the positive electrode tabs 24) where the positive electrode mixture layers 22 of the positive electrodes 20 are formed are disposed so as to oppose the portions where the negative electrode mixture layers 32 of the negative electrodes 30 are formed. In the example illustrated in FIG. 3, while the positive electrode tab 24 and the negative electrode tab 34 extend in the same direction, the electrode tabs can extend in directions opposite each other.

The separators 40 are formed larger than at least the portions where the positive electrode mixture layers 22 of the positive electrodes 20 are formed. On the other hand, the separators 40 can be smaller than the negative electrodes 30. While the thickness of each separator 40 is not limited in particular, it is preferably 10 μm to 25 μm, and more preferably is 10 μm to 15 μm.

A porous sheet having ion permeability and insulation properties is used in the separator 40. Specific examples of the porous sheet include a microporous thin film, woven fabric, nonwoven fabric, and the like. The material of the separator is, desirably, an olefin based resin such as polyethylene or polypropylene, cellulose, or the like. The separator may be a laminated body including a cellulose fiber layer and a fiber layer of thermoplastic resin such as olefin based resin, or may be a multilayer separator including a polyethylene layer and a polypropylene layer.

Two adjacent separators 40 may be adhered to each other. For example, two separators 40 that hold the positive electrodes 20 in between may be adhered to each other into a bag shape and outside of the positive electrode 20 so as to enclose the positive electrodes 20. Note that the distal end side portion of the positive electrode tab 24 is pulled out from between two separators 40. In a case in which there is no inorganic layer famed on the surfaces of each separator 40, by overlapping and hot pressing the edge portions of the two separators 40, the edge portions can be welded to each other.

The metal plate 50 is provided so as to be held between the electrode groups 18A and 18B, and overlaps the electrode groups 18A and 18B in the stacking direction X. In other words, the electrode groups 18A and 18B are disposed so as to oppose each other in the stacking direction X with the metal plate 50 interposed therebetween. The metal plate 50 has a function of promptly releasing the heat and cooling the electrode body 17 when there is an abnormal heat generation in the electrode groups 18A and 18B. Note that when the electrode body 17 is constituted by three or more electrode groups 18, desirably, two or more metal plates 50 are provided, and a metal plate 50 is disposed between all of the electrode groups 18.

In the present embodiment, the separators 40 are not disposed between the electrode groups 18A and 18B, a single metal plate 50 is disposed, and the metal plate 50 is in contact with the negative electrodes 30 that constitute the electrode groups 18A and 18B. More specifically, a single metal plate 50 is in contact with the mixture layer of the negative electrode 30 disposed at an outermost portion of the electrode group 18A and the mixture layer of the negative electrode 30 disposed at an outermost portion of the electrode group 18B. Desirably, the metal plate 50 is pressed from both sides in the stacking direction X with the electrode groups 18A and 18B and is firmly abutted against the negative electrode mixture layer 32 of each electrode group.

As described above, the metal plate 50 is thermally and electrically in contact with the mixture layers of the negative electrodes 30 constituting the electrode groups 18A and 18B. The negative electrodes 30 are each provided on the sides of the metal plate 50 in the stacking direction X, and there is no portion in which the metal plate 50 and a positive electrode 20 oppose each other without the negative electrodes 30 in between. Accordingly, there is no need to provide insulation members, such as the separators 40, between the metal plate 50 and the electrode groups 18A and 18B, and satisfactory thermal connections with the electrode groups 18A and 18B are established at all times. Furthermore, desirably, the electrode groups 18A and 18B are bundled with, for example, an insulation sheet or the like so that the metal plate 50 is fixed between the electrode groups 18A and 18B without using an adhesive agent.

The metal plate 50 is provided between the electrode groups 18A and 18B while being in a noncontact state with the conductive members other than the negative electrode mixture layers 32, for example, the outer can 11, the negative electrode tabs 34, and other collector members. The metal plate 50 is in contact with the negative electrodes 30 constituting the electrode groups 18 with the negative electrode mixture layers 32 in between, and is not in contact with the negative electrode core material 31 directly. Accordingly, when an internal short circuit occurs, generation of heat in the metal plate 50 itself due to a large electric current flowing in the metal plate 50 can be prevented.

The metal plate 50 has a thickness that is larger than those of the positive electrode core material 21 and the negative electrode core material 31. The thickness of the metal plate 50 is, for example, at least twice the thickness of the negative electrode core material 31 and, preferably, is 2 to 20 times thicker and, more preferably, is 3 to 10 times thicker. A specific example of the preferable thickness of the metal plate 50 is 50 μm to 200 μm. By increasing the thickness of the metal plate 50 at an area that does not affect the battery capacity and the like, the heat capacity of the metal plate 50 can be increased and the heat releasing effect can be improved.

The material of the metal plate 50 is not limited in particular as long as the material has high thermal conductivity and does not become liquidated by cell reaction. The suitable metal material includes copper, nickel, iron, and an alloy such as stainless steel (sus). Taking the material cost and the like into consideration, it is particularly desirable to configure the metal plate 50 with copper or stainless steel.

Desirably, the metal plate 50 is larger than the portion in which the mixture layer is formed in the positive electrode 20, and is provided so as to overlap the entirety of the above portion in the stacking direction X with the negative electrodes 30 and the separators 40 interposed therebetween. In other words, the metal plate 50 is disposed so as to oppose the entire positive electrode base portions 23, with the negative electrodes 30 interposed in between, that are portions where the mixture layers of the positive electrode 20 are formed. In a case in which mixture layers are famed at the base portions of the positive electrode tabs 24, for example, the metal plate 50 is disposed so as to oppose the base portions as well. The metal plate 50 is disposed in the above manner with respect to all of the positive electrodes 20 that constitute the electrode groups 18A and 18B. With the above, even in a case in which an abnormal heat generation occurs in the edge portions of the positive electrodes 20, the heat releasing effect with the metal plate 50 can be obtained.

Desirably, the metal plate 50 is smaller than the negative electrodes 30, and is provided so that the entire metal plate 50 overlaps the negative electrodes 30 in the stacking direction X. The metal plate 50 is, for example, formed smaller than the negative electrode base portions 33 that are portions in which the mixture layers of negative electrodes 30 are famed. In other words, the metal plate 50 is larger than the portions in which the mixture layers of the positive electrodes 20 are formed and is smaller than the portions in which the mixture layers of the negative electrodes 30 are famed. Furthermore, the metal plate 50 is disposed as described above with respect to all of the positive electrodes 20 and the negative electrodes 30 that constitute the electrode groups 18A and 18B. With the above, while preventing the metal plate 50 from contacting the collector members such as the negative electrode tabs 34, an excellent heat releasing effect can be obtained.

Figure 4:
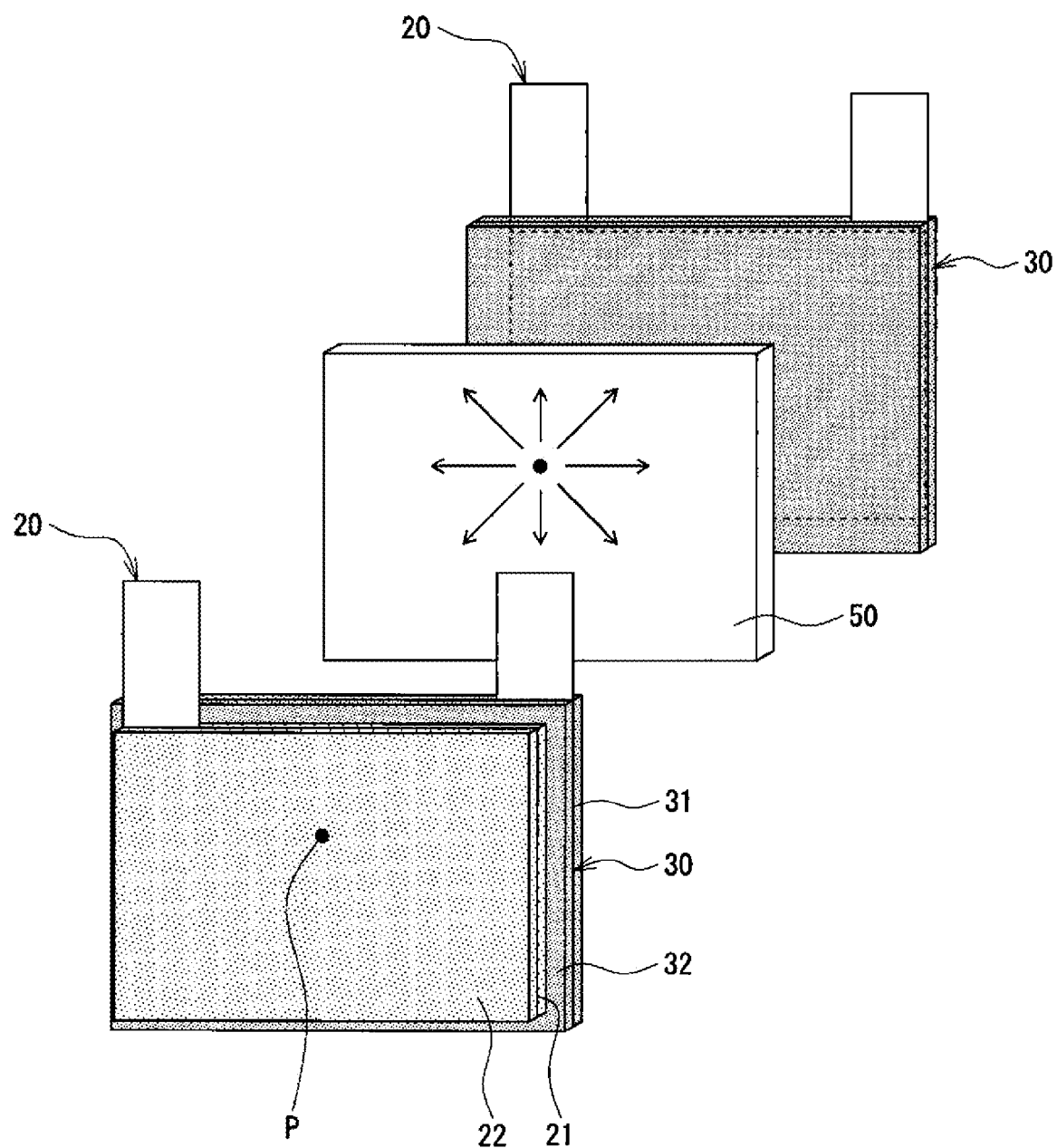
FIG. 4 is a drawing for describing a function of the electrode bodies that are each an example of the embodiment.

FIG. 4 is a diagram for describing a function of the metal plate 50, and illustrates a vicinity of the metal plate 50 in the electrode body 17 (the separators 40 are not shown). Herein, the description is given assuming that an internal short circuit has occurred in point P in the electrode group 18A and local heat is generated.

As exemplified in FIG. 4, when a heat is generated locally in point P in the electrode group 18A, the heat is transmitted to the metal plate 50 and is promptly diffused and released with the metal plate 50. Since the metal plate 50 is in direct contact with the mixture layer of the negative electrode 30 disposed at the outermost portion of the electrode group 18A, a satisfactory thermal contact is established at all times between the metal plate 50 and the electrode group 18A, and the local heat can be released promptly at the initial stage of the occurrence of the abnormality. Accordingly, generation of further heat due to an increase in the short circuited portion can be suppressed. Note that since the metal plate 50 is thicker and the heat capacity is larger than the positive electrode core material 21 and the negative electrode core material 31, even when heat is transmitted thereto from the electrode group 18A, the temperature thereof does not easily increase, and the heat is not easily transferred to the electrode group 18B.

Furthermore, since the metal plate 50 is not in contact with the conductive members other than the negative electrode mixture layers 32 and is in contact with the electrode groups 18 through the resistance of the negative electrode mixture layers 32, a circuit having a low resistance and in which a large electric current flows in the metal plate 50 is not formed. In other words, a problem such as a generation of heat in the metal plate 50 due to a large electric current flowing in the metal plate 50 does not occur.

The design of the embodiment described above can be changed appropriately within the extent that does not obscure the object of the present disclosure. For example, in addition to between the electrode groups, a heat releasing plate may be provided in contact with the negative electrodes that are positioned on the outermost portions of the electrode groups and that are on the sides (outer sides of the electrode body) that do not oppose the other electrode group. A member that is similar to the metal plate described above can be used as the heat releasing plate. Furthermore, while it is desirable that the metal plate is directly in contact with the mixture layers of the negative electrodes constituting the electrode groups, for example, there may be an adhesive agent between the mixture layers to a degree that does not hinder the thermal conductivity thereof.

Figure 5:
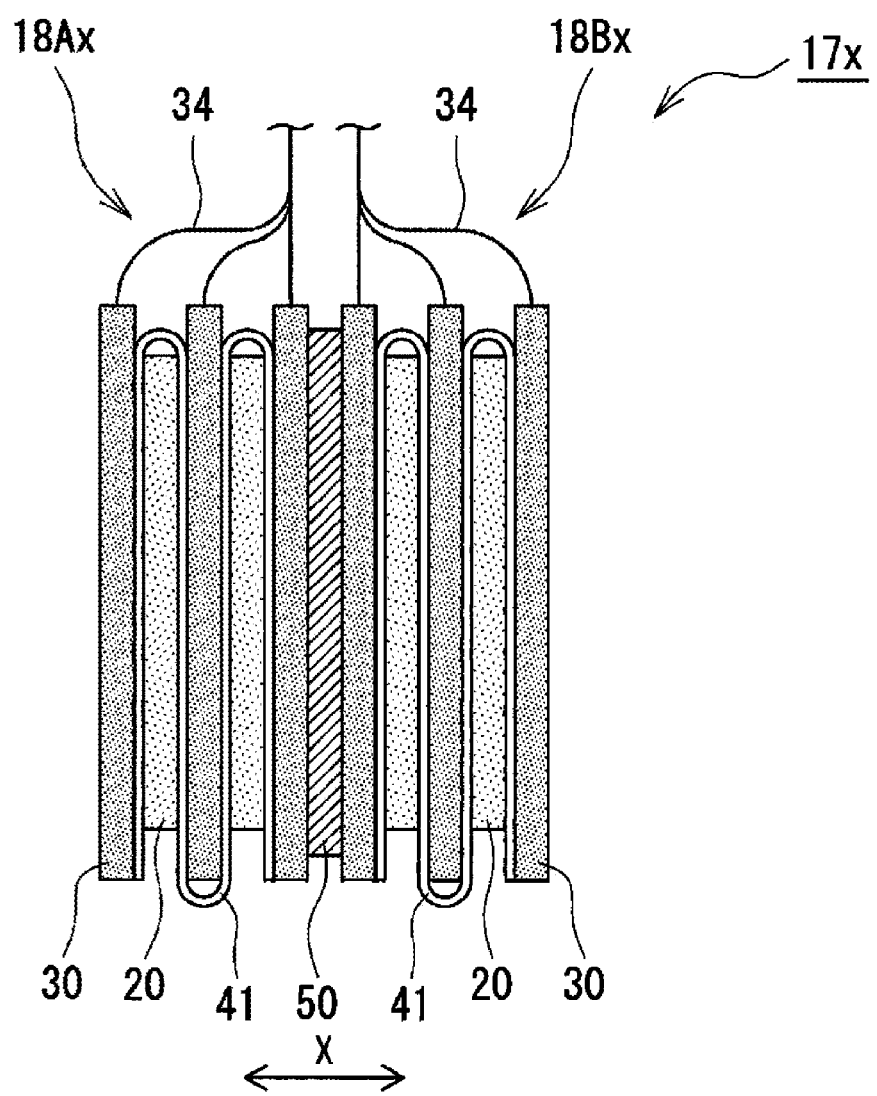
FIG. 5 is a cross-sectional view of electrode bodies that are each another example of the embodiment.
Figure 6:
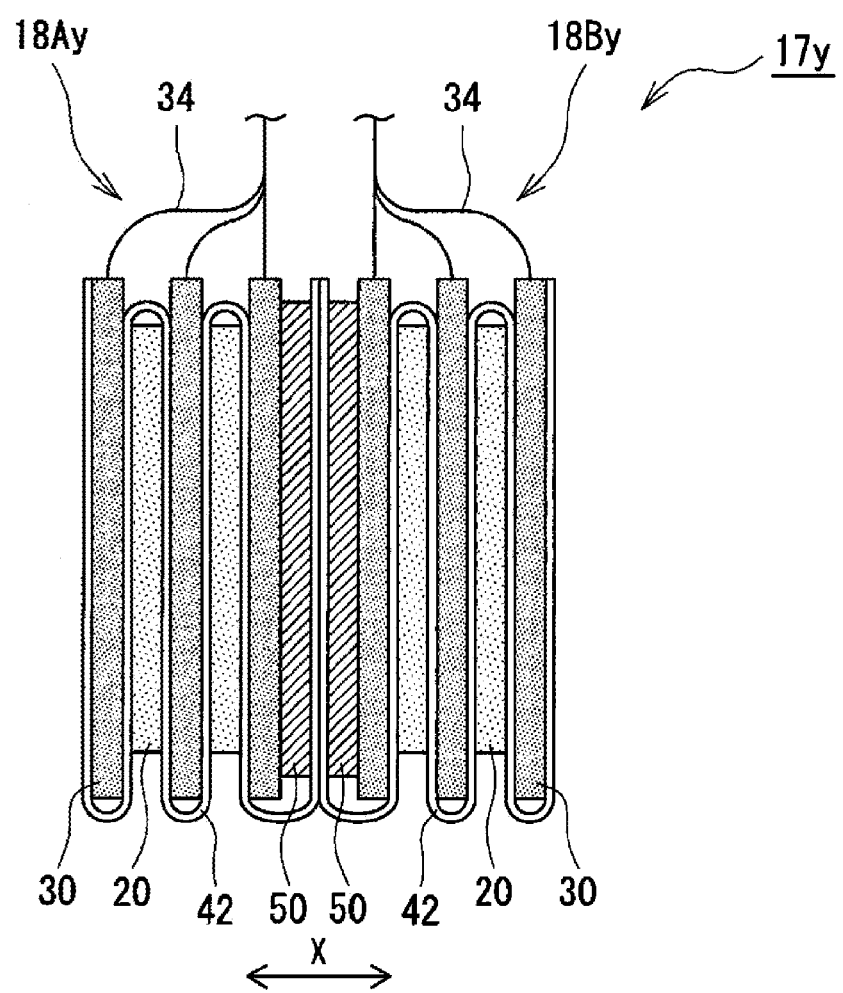
FIG. 6 is a cross-sectional view of electrode bodies that are each another example of the embodiment.

FIGS. 5 and 6 are cross-sectional views illustrating the electrode bodies 17x and 17y that are other examples of the embodiment. Group of electrodes 18Ax and 18Bx of the electrode body 17x exemplified in FIG. 5 is different from the electrode groups 18A and 18B in that a single separator 41 is used. The separator 41 is folded in a zigzag manner and is disposed between the positive electrodes 20 and the negative electrodes 30. On the other hand, the negative electrode 30 is disposed on both ends of each of the electrode group 18Ax and 18Bx in the stacking direction X, and the separator 41 is not arranged thereat. The separator 41 is not disposed between the electrode group 18Ax and 18Bx, a single metal plate 50 is disposed therebetween, and the metal plate 50 is directly in contact with the mixture layers of the negative electrodes 30 of the electrode groups.

Group of electrodes 18Ay and 18By of the electrode body 17y exemplified in FIG. 6 is common to the electrode group 18Ax and 18Bx in that a single separator 42 folded in a zigzag manner is used. On the other hand, different from the electrode group 18Ax and 18Bx, the separator 42 is provided at both ends of the electrode groups 18Ay and 18By in the stacking direction X. In other words, the surfaces of the negative electrodes 30 that are positioned on the outermost side of the electrode groups 18Ay and 18By and that are faced towards the outside are covered by the separator 42.

In the electrode body 17y, two metal plates 50 are provided between the electrode groups 18Ay and 18By. One of the metal plates 50 is directly in contact with the mixture layer of the negative electrode 30 of the electrode group 18Ay, and the other metal plate 50 is directly in contact with the mixture layer of the negative electrode 30 of the electrode group 18By. In other words, the metal plates 50 are each inserted between the electrode groups 18Ay and 18By and the separators 42. Furthermore, two separators 42 are provided between the two metal plates 50. In such a case, there is an advantage in that, for example, it is more difficult for the heat generated in the electrode group 18Ay to be transmitted to the electrode group 18By.

INDUSTRIAL APPLICABILITY

The present disclosure can be used in a secondary cell.

REFERENCE SIGNS LIST 10 secondary cell
11 outer can
12 sealing plate
13 positive electrode external terminal
14 negative electrode external terminal
15 gas discharge valve
16 liquid injection portion
17 electrode body
18, 18A, 18B electrode group
20 positive electrode
21 positive electrode core material
22 positive electrode mixture layer 23 positive electrode base portion
24 positive electrode tab
30 negative electrode
31 negative electrode core material
32 negative electrode mixture layer
33 negative electrode base portion
34 negative electrode tab
40, 41, 42 separator
50 metal plate

The invention claimed is:

1. A secondary cell comprising:
an electrode body including
a plurality of electrode groups each including a plurality of positive electrodes, a plurality of negative electrodes, and at least one separator, the positive electrodes and the negative electrodes each being alternately stacked on each other with the separator interposed in between; and
at least one metal plate disposed between the electrode groups, wherein
electrodes that are disposed at both ends of each of the electrode groups are the negative electrodes,
the metal plate is in contact with a mixture layer of a negative electrode that constitutes at least one of the electrode groups, the metal plate being provided in a noncontact state with conductive members other than the mixture layer,
the metal plate is larger than a portion in which a mixture layer of each of the positive electrodes are formed, and is provided such that the metal plate and an entirety of the portion in which the mixture layer of each of the positive electrodes are formed overlap each other with the negative electrode in between, and
the metal plate is smaller than each of the negative electrodes and is provided such that an entirety of the metal plate overlaps each of the negative electrodes.

2. The secondary cell according to claim 1, wherein a thickness of the metal plate is larger than a thickness of a core material of each of the negative electrodes and positive electrodes.

3. The secondary cell according to claim 1, wherein
the separator is not disposed between the electrode groups and the single metal plate is disposed therebetween, and
the metal plate is in contact with mixture layers of the negative electrodes that constitute the electrode groups.

* * * * *